United States Patent
Kwon et al.

(10) Patent No.: US 9,358,530 B2
(45) Date of Patent: Jun. 7, 2016

(54) CARBON DIOXIDE ADSORBENT INCLUDING ZEOLITE AND METHODS FOR PREPARING THE SAME

(71) Applicant: Samsung Electronics Co., Ltd., Suwon-Si, Gyeonggi-Do (KR)

(72) Inventors: Hyuk Jae Kwon, Suwon-si (KR); Soon Chul Kwon, Hwaseong-si (KR); Hyun Chul Lee, Hwaseong-si (KR); Wha Seung Ahn, Incheon (KR); Seung Hwan Hong, Incheon (KR)

(73) Assignees: SAMSUNG ELECTRONICS CO., LTD., Gyeonggi-Do (KR); INHA-INDUSTRY PARTNERSHIP INSTITUTE, Incheon (KR)

( * ) Notice: Subject to any disclaimer, the term of this patent is extended or adjusted under 35 U.S.C. 154(b) by 0 days.

(21) Appl. No.: 14/181,818

(22) Filed: Feb. 17, 2014

(65) Prior Publication Data

US 2014/0251135 A1    Sep. 11, 2014

(30) Foreign Application Priority Data

Mar. 11, 2013 (KR) .................. 10-2013-0025847

(51) Int. Cl.
| | |
|---|---|
| *B01D 53/02* | (2006.01) |
| *B01J 29/70* | (2006.01) |
| *B01J 20/18* | (2006.01) |
| *B01J 20/30* | (2006.01) |
| *B01J 20/34* | (2006.01) |

(52) U.S. Cl.
CPC ............ *B01J 29/7015* (2013.01); *B01D 53/02* (2013.01); *B01J 20/18* (2013.01); *B01J 20/186* (2013.01); *B01J 20/3085* (2013.01); *B01J 20/3408* (2013.01); *B01J 20/3483* (2013.01); *B01J 20/3491* (2013.01); *B01D 2253/108* (2013.01); *B01D 2257/504* (2013.01); *Y02C 10/08* (2013.01)

(58) Field of Classification Search
CPC ................... B01D 2253/108; B01D 2257/504; B01D 53/02; B01J 20/18; B01J 20/186; B01J 20/3085; B01J 20/3408; B01J 20/3483; B01J 20/3491; B01J 29/7015; Y02C 10/08
See application file for complete search history.

(56) References Cited

U.S. PATENT DOCUMENTS

| | | | |
|---|---|---|---|
| 6,709,644 | B2 | 3/2004 | Zones et al. |
| 7,442,232 | B2 | 10/2008 | White et al. |
| 7,976,697 | B2 | 7/2011 | Krishnamoorthy et al. |
| 2003/0069449 | A1 | 4/2003 | Zones et al. |
| 2009/0050527 | A1 | 2/2009 | Krishnamoorthy et al. |
| 2010/0291471 | A1 | 11/2010 | Jacobson et al. |
| 2011/0020204 | A1* | 1/2011 | Bull et al. ............... 423/239.2 |
| 2011/0311429 | A1 | 12/2011 | Liu et al. |
| 2012/0244066 | A1* | 9/2012 | Bull ............... B01D 53/9418 423/703 |

FOREIGN PATENT DOCUMENTS

| | | |
|---|---|---|
| KR | 2008-0013952 A | 2/2008 |
| KR | 2008-0074851 A | 8/2008 |

* cited by examiner

*Primary Examiner* — Christopher P Jones
(74) *Attorney, Agent, or Firm* — Harness, Dickey & Pierce, P.L.C.

(57) ABSTRACT

A carbon dioxide adsorbent may include a chabazite zeolite containing an alkali metal ion or an alkaline earth metal ion. The chabazite zeolite may have a Si/Al mole ratio of about 1 to about 9.9. The carbon dioxide adsorbent may be included in a carbon dioxide capture module. The carbon dioxide adsorbent may also be used in a method of separating carbon dioxide.

19 Claims, 5 Drawing Sheets

CARBON DIOXIDE ADSORBENT INCLUDING ZEOLITE AND METHODS FOR PREPARING THE SAME

CROSS-REFERENCE TO RELATED APPLICATION

This application claims priority under 35 U.S.C. §119 to Korean Patent Application No. 10-2013-0025847, filed in the Korean Intellectual Property Office on Mar. 11, 2013, the entire contents of which are incorporated herein by reference.

BACKGROUND

1. Field

Example embodiments herein relate to a carbon dioxide adsorbent including zeolite, a process for preparing the same, and a method of separating carbon dioxide using the same.

2. Description of the Related Art

A considerable increase in the concentration of global atmospheric $CO_2$, one of the greenhouse gases, has raised concern about climate change and has led to increasing efforts in research and development on control of $CO_2$ emissions. The main $CO_2$ emission sources include fossil fuel-based power plants, vehicles, and manufacturing plants for cement, limestone, hydrogen, ammonia, and the like. Capture and separation of carbon dioxide from fixed facilities such as various power plants or factories are considered as first measures for the control of $CO_2$ emissions. The capture of carbon dioxide refers to a process of physically or chemically separating $CO_2$ among a gas mixture generated from chemical reactions or combustion of fossil fuels. In order to capture $CO_2$ by adsorption, carbon materials, zeolites, metal-organic composite materials (MOF), or the like may be used. They show a certain level of adsorption efficiency at a low temperature of 0° C. to room temperature, but they have difficulties in being used for carbon dioxide adsorption in a higher temperature environment. Hydrotalcite shows adsorption capacity of about 1 to 2 wt % at a temperature of about 200 to 300° C. and under a normal pressure, but its adsorption capacity is too low to practically carry out a carbon dioxide adsorption process. Among fixed $CO_2$-emission facilities emitting a considerable amount of carbon dioxide are fossil fuel-based power plants (e.g., an integrated gasification combined cycle (IGCC) system or a thermoelectric power plant) and natural gas wells. In order to address cost-related issues, power plants emitting a huge amount of carbon dioxide require adsorbent materials that may adsorb carbon dioxide at a relatively high temperature, for example, about 200 to 550° C.

SUMMARY

Some example embodiments relate to a carbon dioxide adsorbent having an improved adsorption capacity and usable in a relatively high temperature range.

Some example embodiments relate to a process for preparing the carbon dioxide adsorbent.

Some example embodiments relate to a carbon dioxide adsorption module including the carbon dioxide adsorbent.

Some example embodiments relate to a method of separating carbon dioxide that includes using the carbon dioxide adsorbent.

According to one example embodiment, a carbon dioxide adsorbent that includes a chabazite zeolite containing an alkali metal ion or an alkaline earth metal ion and having a Si/Al mole ratio of about 1 to about 9.9 is provided.

The chabazite zeolite may have a Si/Al mole ratio of about 1 to about 3.

The alkali metal ion or alkaline earth metal ion may include a lithium (Li) ion, a sodium (Na) ion, a potassium (K) ion, a magnesium (Mg) ion, or a calcium (Ca) ion.

The chabazite zeolite may have a chabazite structure obtained by structural transformation by a strong base.

According to another example embodiment, a process for preparing a carbon dioxide adsorbent that includes a chabazite zeolite containing an alkali metal ion or an alkaline earth metal ion and having a Si/Al mole ratio of about 1 to about 9.9 is provided, the process including obtaining zeolite having a structure other than a chabazite structure (e.g., non-chabazite structure) and a Si/Al mole ratio of about 1 to 9.9; and adding the zeolite to an aqueous solution of a strong base having an alkali metal ion or an alkaline earth metal ion and subjecting the same to a hydrothermal treatment to obtain a chabazite zeolite including the alkali metal ion or the alkaline earth metal ion.

The process for preparing the carbon dioxide adsorbent may further include exchanging the alkali metal ion or the alkaline earth metal ion of the chabazite zeolite with another alkali metal ion or alkaline earth metal ion.

The process for preparing the carbon dioxide adsorbent may include forming the chabazite zeolite without using a structure directing agent.

The zeolite having a structure other than the chabazite structure may include faujasite or mordenite.

The zeolite may have a Si/Al mole ratio of about 1 to about 3.

The strong base compound having the alkali metal ion or the alkaline earth metal ion may include KOH, NaOH, or LiOH.

The hydrothermal treatment may be conducted at a temperature of higher than or equal to about 80° C. for a period of time of about 40 hours or longer.

According to yet another example embodiment, a carbon dioxide capture module may include a carbon dioxide adsorbent that includes a chabazite zeolite containing an alkali metal ion or an alkaline earth metal ion and having a Si/Al mole ratio of about 1 to about 9.9.

According to yet another example embodiment, a method of separating carbon dioxide is provided, that includes bringing an input gas stream containing carbon dioxide into contact with a carbon dioxide adsorbent including a chabazite zeolite containing an alkali metal ion or an alkaline earth metal ion and having a Si/Al mole ratio of about 1 to about 9.9.

In the method of separating carbon dioxide, the alkali metal ion or alkaline earth metal ion may include a lithium ion, a sodium ion, a potassium ion, a magnesium ion, or a calcium ion.

In the method of separating carbon dioxide, the Si/Al mole ratio the zeolite may range from about 1 to about 3.

The method may further include heat-treating the carbon dioxide adsorbent at a temperature of about 200° C. to about 500° C., optionally under a reduced pressure condition, to desorb the carbon dioxide.

The input gas stream may further include at least one gas selected from hydrogen, nitrogen, and methane along with the carbon dioxide.

The input gas stream may be in contact with the carbon dioxide adsorbent at a temperature of about 30° C. to about 500° C.

The carbon dioxide adsorbent may adsorb carbon dioxide with relatively high efficiency even at a relatively high temperature while showing a relatively high adsorption capacity, and desorbing the carbon dioxide from the same may be carried out with relative ease.

DETAILED DESCRIPTION

Figure 1:
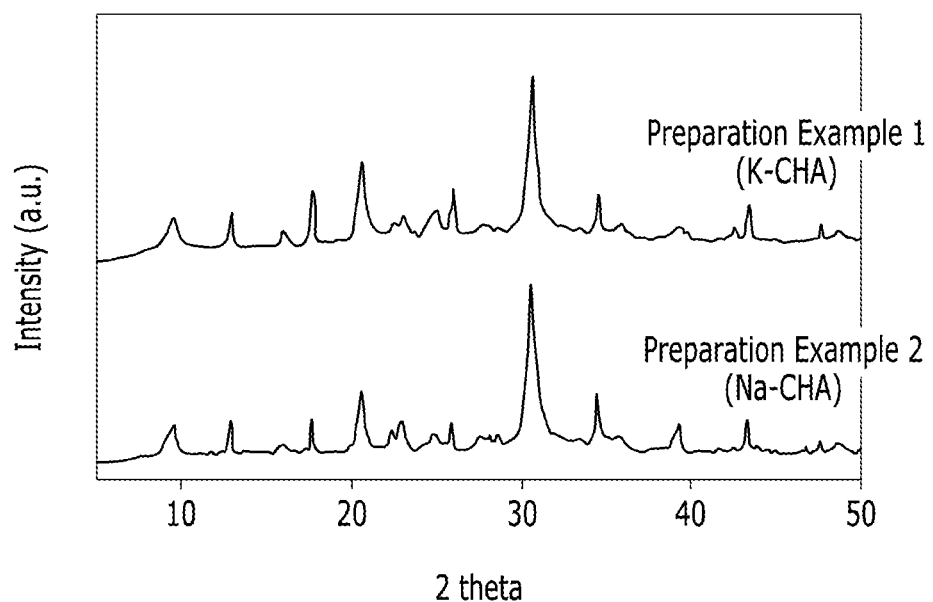
FIG. 1 shows an X-ray diffraction spectrum of the carbon dioxide adsorbents of Preparation Examples 1 and 2.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Unless specifically mentioned to the contrary, the term "chabazite zeolite" used herein refers to a zeolite having a chabazite crystalline structure.

Unless specifically mentioned to the contrary, the term "input gas stream" used herein refers to a gas stream prior to passing through an adsorbent region or prior to initial contact with an adsorbent.

A carbon dioxide adsorbent according to an example embodiment may include a chabazite zeolite containing an alkali metal ion or an alkaline earth metal ion. The chabazite zeolite may have a Si/Al mole ratio of about 1 to about 9.9, about 1 to about 6, or about 1 to about 3. The alkali metal ion or alkaline earth metal ion contained in the chabazite zeolite may include a lithium ion, a sodium ion, a potassium ion, a magnesium ion, or a calcium ion. The chabazite zeolite may be a zeolite that is prepared by treating a zeolite having a structure other than the chabazite structure (e.g., non-chabazite structure) with a strong base in order for the zeolite to be transformed into a zeolite having a chabazite structure. Specific examples of the zeolite having a structure other than the chabazite structure include, but are not limited to, a zeolite having a faujasite structure such as zeolite X or zeolite Y, mordenite, and zeolite A.

Zeolite may show a certain level of adsorption capacity for carbon dioxide in a relatively low temperature range of 100° C. or lower, but it shows a poor adsorption capacity at a relatively high temperature. However, as the zeolite has a chabazite structure transformed by a strong base and contains an alkali metal ion or an alkaline earth metal ion therein, its adsorption capacity may increase to a level greater than or equal to about 5 wt %, or for example, greater than or equal to about 10 wt % at a temperature of 120° C. or higher (for example, 200° C. or the like). Without wishing to be bound by a certain theory, the increase in the adsorption capacity at such a high temperature may result from the fact that the changes in the crystalline structure (such as the transformation from a faujasite crystalline structure to a chabazite crystalline structure) bring forth the generation of new adsorption sites for carbon dioxide. The increase may also result from the fact that a chabazite structure having smaller pores (than that of zeolite Y which has larger pores) is advantageous in the carbon dioxide adsorption.

The chabazite zeolite may have a specific surface area of less than or equal to about 600 m$^2$/g, e.g., from about 10 m$^2$/g to about 550 m$^2$/g. When being compared with conventional zeolite used in carbon dioxide adsorption, the chabazite zeolite may have a smaller specific surface area but exhibit a higher level of adsorption capacity.

In another example embodiment, a process for preparing a carbon dioxide adsorbent including zeolite may include obtaining a zeolite having a structure other than a chabazite structure and a Si/Al mole ratio of about 1 to about 9.9; and adding the zeolite to an aqueous solution of a strong base having an alkali metal ion or alkaline earth metal ion and subjecting the same to a hydrothermal treatment to obtain a chabazite zeolite containing the alkali metal ion or alkaline earth metal ion.

The process for preparing the carbon dioxide adsorbent may further include exchanging the alkali metal ion or alkaline earth metal ion in the chabazite zeolite with another alkali metal ion or alkaline earth metal ion.

The process for preparing the carbon dioxide adsorbent may further include separating the chabazite zeolite containing the (ion-exchanged) alkali metal ion or the alkaline earth metal ion.

The zeolite having a structure other than the chabazite structure may include faujasite or mordenite. For example, the Si/Al mole ratio may range from about 1 to about 6, or from about 1 to from about 3. Specific examples of the zeolite having a structure other than the chabazite structure may include, but are not limited to, zeolite X, zeolite Y, mordenite, and zeolite A. The zeolite having a structure other than the chabazite structure may be synthesized in accordance with any known synthesis method, or it may be obtained from a commercially available source.

Conventionally, synthesis of the chabazite zeolite entails using an expensive structure directing agent (SDA) or making a non-commercialized SDA and using the same. However, in the aforementioned process according to example embodiments, it is possible to obtain a chabazite zeolite from a zeolite having a structure other than the chabazite zeolite without using any structure directing agent. The zeolite having a structure other than the chabazite structure is added to an aqueous solution of a strong base containing an alkali metal ion or alkaline earth metal ion, and the resulting mixture is subjected to a hydrothermal treatment to produce a chabazite zeolite via structural transformation. The strong base having the alkali metal ion or alkaline earth metal ion may include KOH, NaOH, or LiOH. The pH of the aqueous solution of the strong base containing the alkali metal ion or alkaline earth metal ion may be greater than or equal to about 12, for example greater than or equal to about 14. The aforementioned pH range may facilitate the transformation into the chabazite structure. The hydrothermal treatment may be conducted at a temperature of greater than or equal to about 80° C., for example from about 90° C. to 110° C., for a period of time of about 40 hours or longer, for example about 3 days or longer, or about 5 days to about 15 days.

The chabazite zeolite obtained from such hydrothermal treatment contains an alkali metal ion or alkaline earth metal ion derived from the strong base, and the alkali metal ion or alkaline earth metal ion may be further replaced with a Li$^+$, Na$^+$, K$^+$, Mg$^{2+}$, or Ca$^{2+}$ ion via an additional ion-exchanging process. The ion-exchange process may include contacting the chabazite zeolite thus obtained with a solution containing a salt compound having a desired cation. Specific examples of the salt compound may include, but are not limited to, a chloride and other halides, an acetate, a nitrate, and a sulfate. The contacting may include a hydrothermal treatment. The hydrothermal treatment for the ion exchange may be conducted at a temperature of greater than or equal to about 60° C. for about 2 hours or longer, for example, at a temperature of greater than or equal to about 70° C. for about 5 hours to 24 hours, but it is not limited thereto.

Separating the chabazite zeolite containing the (ion-exchanged) alkali metal ion or alkaline earth metal ion may be carried out in a suitable manner. By way of an example, the separation may include filtration, centrifuging, and the like. The separated chabazite zeolite may be subjected to washing and drying. The washing may be carried out using water (e.g., distilled water). The drying may be conducted at a temperature of greater than or equal to about 80° C., but the drying conditions are not particularly limited.

In another example embodiment, the method of separating carbon dioxide may include bringing a gas mixture including carbon dioxide into contact with a carbon dioxide adsorbent including a chabazite zeolite containing an alkali metal ion or alkaline earth metal ion and having a Si/Al mole ratio of about 1 to about 9.9.

Details of the carbon dioxide adsorbent may be the same as set forth above. The gas mixture including carbon dioxide may be an input gas stream including carbon dioxide. Besides carbon dioxide, the gas mixture may further include hydrogen, a hydrocarbon (e.g., methane), nitrogen, or a combination thereof. The carbon dioxide adsorbent may be brought into contact with the gas mixture at a temperature of greater than or equal to about 25° C., and for example, about 30° C. to about 400° C. The carbon dioxide adsorbent may exhibit a relatively high level of adsorption capacity not only at a relatively low temperature but also at a relatively high temperature of about 120° C. to about 400° C.

The method of separating carbon dioxide may further include heat-treating the carbon dioxide adsorbent at a temperature of about 50° C. to about 700° C. under a reduced pressure to desorb the carbon dioxide and emitting the same. The desorption pressure is not particularly limited, but is in a range of less than or equal to about 1000 Pa, and specifically about 700 Pa to about 50 Pa, for example, about 100 Pa.

Figure 5:
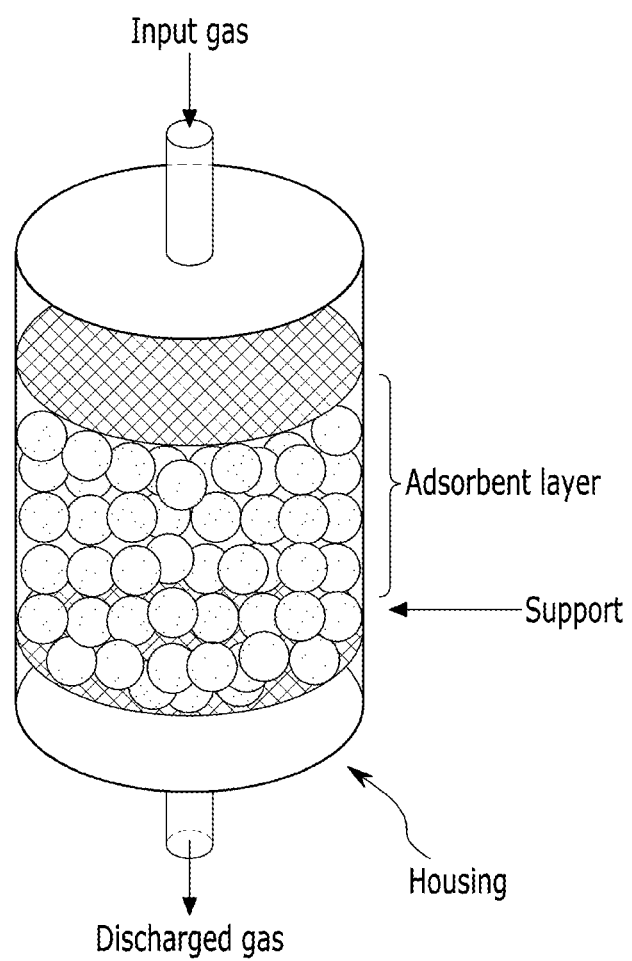
FIG. 5 illustrates a schematic view of a carbon dioxide capture module according to an example embodiment.

The carbon dioxide adsorbent may be used in the form of a carbon dioxide capture module. In a non-limiting example as shown in FIG. 5, the carbon dioxide capture module includes an adsorption layer including the carbon dioxide adsorbent, a support plate holding the adsorption layer, and a housing including an inlet for an input gas stream and an outlet for the treated gas stream. Details for the carbon dioxide adsorbent may be the same as set forth above. The thickness of the adsorption layer is not particularly limited, but may be greater than or equal to about 0.2 cm, and specifically from about 0.5 cm to about 3 cm. The support plate may be made of any materials as long as it may support the adsorbent while allowing the flow of the input gas. Examples of the material may include quartz wool or the like. Materials and shapes of the housing for the module are not particularly limited, but may be selected as needed. By way of non-limiting examples, the housing may be made of stainless steel, copper pipe, or quartz pipe, and may have a shape of cylinder, a prism, a square column, or the like.

The input gas stream may further include at least one gas selected from hydrogen, nitrogen, and hydrocarbons (e.g., methane). The composition of the input gas stream is not particularly limited, but may be appropriately selected as needed. For example, the input gas stream may include carbon dioxide and nitrogen like in a flue gas generated from a fossil fuel power plant. The input gas stream may include carbon dioxide and hydrogen like in a flue gas generated from an integrated gasification combined cycle (IGCC) power plant. The input gas stream may include carbon dioxide and methane like in a gas generated from a natural gas well. The flow rate of supplying the input gas stream is not particularly limited, but may be appropriately selected as desired. For example, the flow rate may be less than or equal to about 1000 ml/min, and specifically, less than or equal to about 500 ml/min.

As set forth above, the carbon dioxide adsorbent may adsorb carbon dioxide with a relatively high efficiency of greater than or equal to about 5 wt % even at a relatively high temperature of 120° C. or higher.

The following illustrate various embodiments of the present disclosure in more detail. However, it should be understood that the following are merely examples, and the present disclosure is not limited thereto.

EXAMPLES

Preparation of Carbon Dioxide Adsorbent Including Chabazite Zeolite and Characterization Thereof Preparation Example 1

6.7 cc of an aqueous solution of KOH (9.5 M) is diluted with water to prepare a KOH aqueous solution (45%). To the KOH aqueous solution (pH=14), 6.25 g of zeolite Y (purchased from Sigma Aldrich, trade name: Y Zeolite, Si/Al=1.72) is added while stirring, and the resulting mixture is heated to 368 K for 15 days to react. The reaction mixture is cooled to room temperature and is filtered to obtain a solid product, which is then washed with water 3 times and dried in air at a temperature of 100° C. for 12 hours to obtain chabazite zeolite.

Preparation Example 2

Chabazite zeolite (gram) prepared in Preparation Example 1 is added to a 1 M aqueous solution of sodium chloride (ml) at a ratio of 1:40. The resulting mixture is heated to 343 K for 12 hours to carry out ion-exchange. The ion-exchanged product is filtered and added to the aqueous solution of sodium chloride to repeat such ion exchange process 4 times. After the ion-exchange process, the resulting product is washed with water 3 times, and dried at a temperature of 100° C. for 12 hours to obtain a Na-substituted chabazite zeolite.

Preparation Example 3

A Mg-substituted chabazite zeolite is obtained in the same manner as set forth in Preparation Example 2, except that the Na-substituted chabazite zeolite prepared in Preparation Example 2 is subjected to an ion-exchange process using a 1 M aqueous solution of magnesium chloride.

Experimental Example 1

X-Ray Diffraction Analysis

X-ray diffraction (XRD) analysis is made for the carbon dioxide adsorbent including the chabazite zeolite prepared in Preparation Examples 1 and 2, and the results are shown in FIG. 1. The X-ray diffraction analysis is performed using a Cu Kα ray as a light source, and is operated at 40 kV and 40 mA at a scan speed of 0.005° per second. The results of FIG. 1 confirm that the zeolite of Preparation Examples 1 and 2 has a chabazite crystalline structure.

Experimental Example 2

Measurement of Specific Surface Areas

Specific surface areas for the zeolite of Preparation Examples 1 and 2 are measured from the adsorption/desorption isotherm curves obtained by conducting a nitrogen adsorption/desorption isothermal reaction with using Bell SorpMax instrument (manufactured by Bell Japan Co. Ltd.). The specific surface areas of the zeolite of Preparation Examples 1 and 2 and zeolite Y are compiled in Table 1.

TABLE 1

| | Specific Surface Area determined by the BET method (m$^2$/g) |
|---|---|
| Preparation Examples 1 (K—CHA) | 12 |
| Preparation Examples 2 (Na—CHA) | 520 |
| Zeolite Y (Na—Y) | 950 |

The results of Table 1 confirm that the carbon dioxide adsorbent including the chabazite zeolite prepared in Preparation Examples 1 and 2 has a significantly smaller specific surface area than zeolite Y, the zeolite prior to structural transformation.

Figure 2:
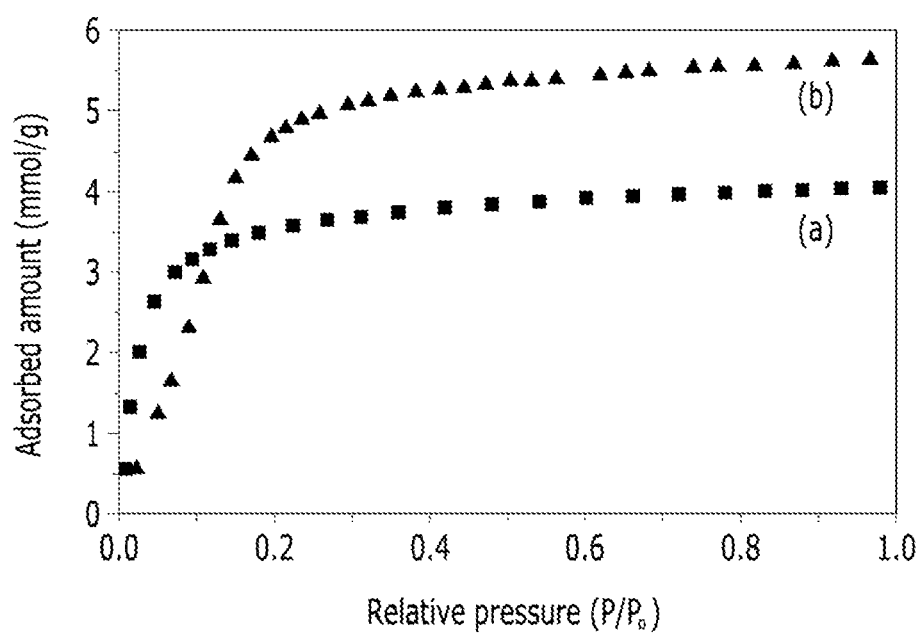
FIG. 2 is a view illustrating the results of a carbon dioxide isothermal adsorption test for the carbon dioxide adsorbents of Preparation Examples 1 and 2.

Isothermal Co$_2$ Adsorption Tests for the Carbon Dioxide Adsorbent Including the Chabazite Zeolite:

$CO_2$ isothermal adsorption tests are conducted using the carbon dioxide adsorbent of Preparation Examples 1 and 2 at a temperature of 0° C. and under a pressure of 0 to 1 bar (100% carbon dioxide), and the results are shown in FIG. 2

FIG. 2 confirms that under the aforementioned conditions, the carbon dioxide adsorbent of Preparation Example 1 shows an adsorption amount of 18.04 wt % (4.1 mmol/g) (plot (a) of FIG. 2), and the carbon dioxide adsorbent of Preparation Example 2 shows an adsorption amount of 25.08 wt % (5.7 mmol/g) (plot (b) of FIG. 2).

Figure 3:
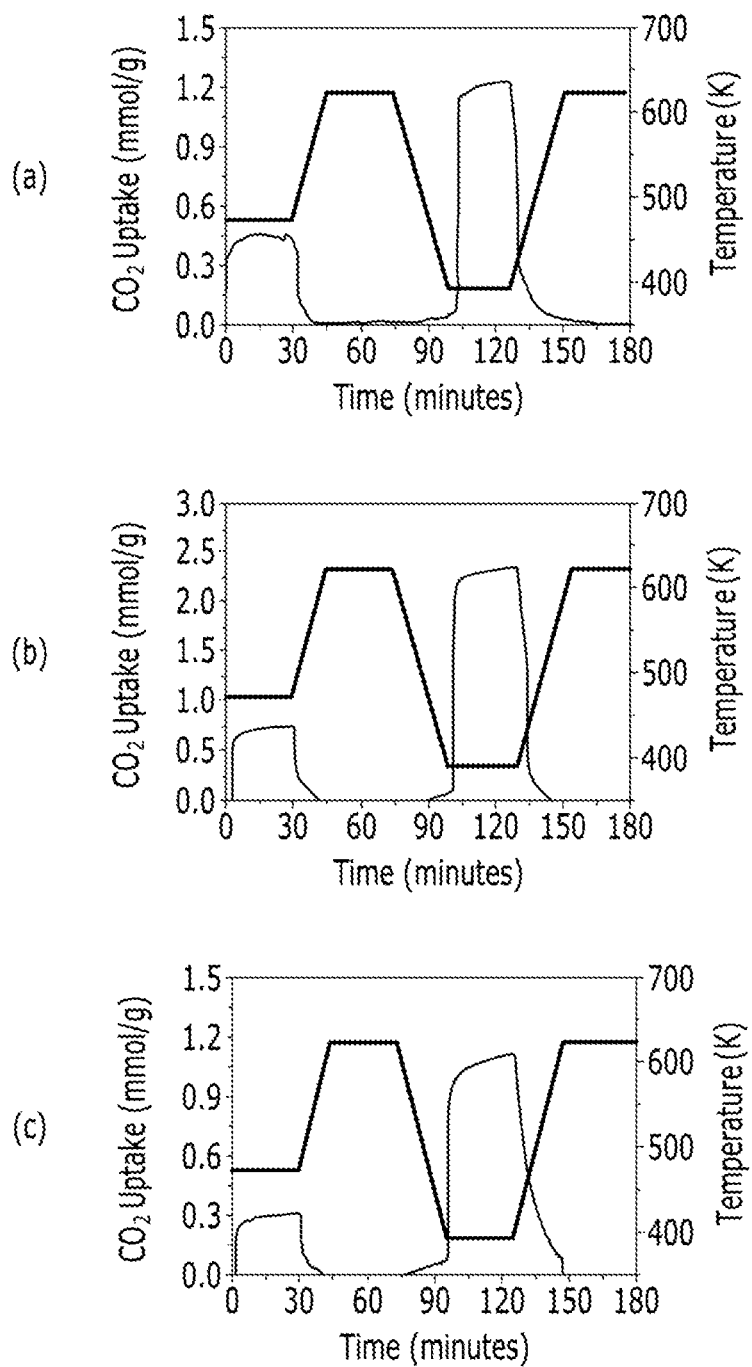
FIG. 3(a) to (c) illustrate the results of carbon dioxide isothermal adsorption/desorption tests for the carbon dioxide adsorbent of Preparation Example 1, carbon dioxide adsorbent of Preparation Example 2, and zeolite Y, respectively, prior to being subjected to structural transformation.

$CO_2$ Adsorption/Desorption Tests for the Carbon Dioxide Adsorbent Including the Chabazite Zeolite:

$CO_2$ adsorption/desorption tests are conducted using the carbon dioxide adsorbent of Preparation Examples 1 and 2 and zeolite Y (not structurally transformed) under the following conditions, and the results are shown in FIG. 3:

Gas: 100% $CO_2$ for adsorption and 100% $H_2$ for desorption
Adsorption temperature: 120° C. and 200° C.
Desorption temperature: 375° C.

For each of the carbon dioxide adsorbents including the zeolite of Preparation Examples 1 and 2 and the $CO_2$ adsorption amount of zeolite Y (not structurally transformed), the $CO_2$ adsorption amount are calculated from the results of FIG. 3, and are summarized in Table 2.

TABLE 2

| | $CO_2$ adsorption amount at 120° C. | $CO_2$ adsorption amount at 200° C. |
|---|---|---|
| Prep. Example 1 (K—CHA) | 5.28 wt % (1.2 mmol/g) | 2.2 wt % (0.5 mmol/g) |
| Prep. Example 2 (Na—CHA) | 11 wt % (2.5 mmol/g) | 3.52 wt % (0.8 mmol/g) |
| Zeolite Y | 4.84 wt % (1.1 mmol/g) | 1.32 wt % (0.3 mmol/g) |

The results of Table 2 show that an adsorption amount of the chabazite zeolite of Preparation Examples 1 and 2 is at least two times higher than that of Zeolite Y (not structurally transformed).

Figure 4:
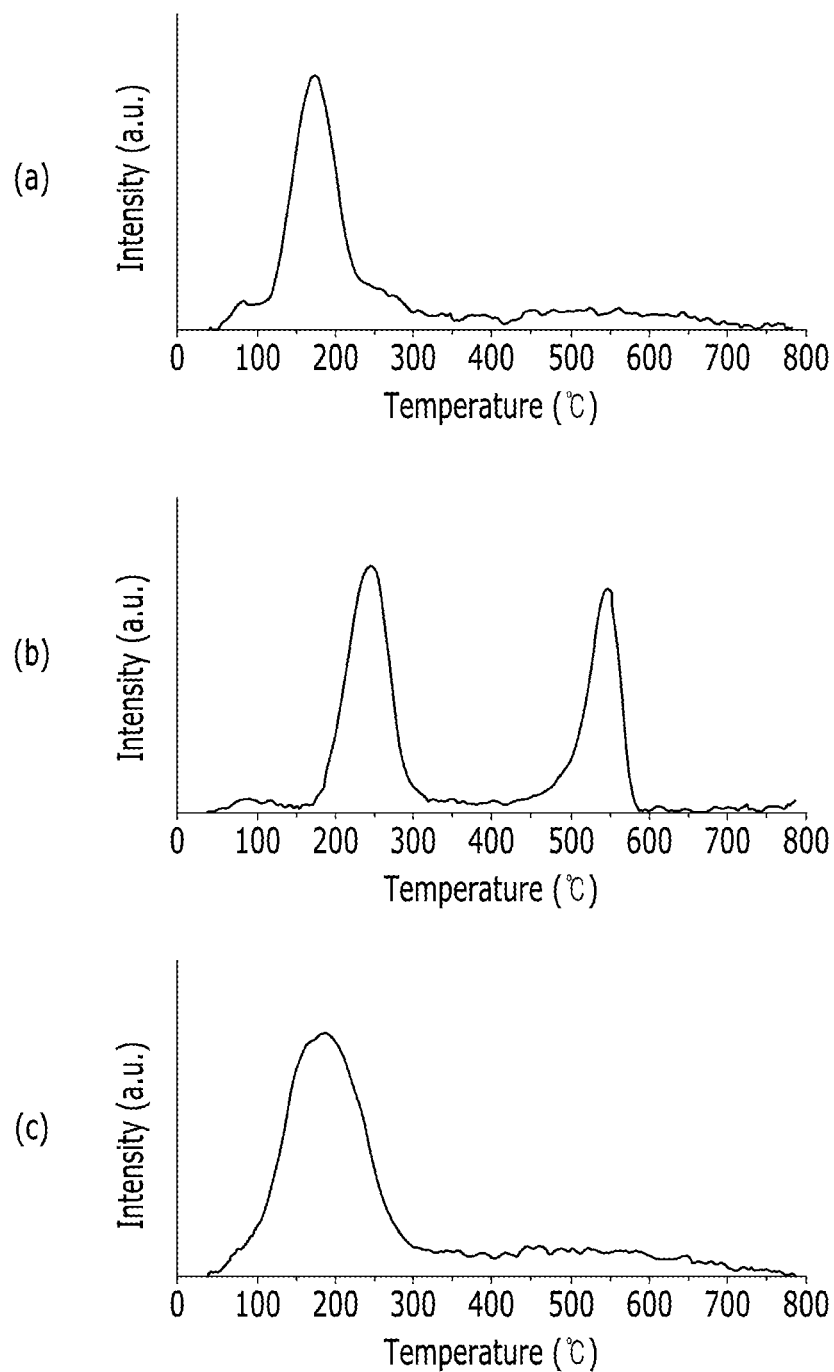
FIG. 4(a) to (c) illustrate the results of temperature programmed desorption tests for the carbon dioxide adsorbent of Preparation Example 1, carbon dioxide adsorbent of Preparation Example 2, and zeolite Y, respectively, prior to being subjected to structural transformation.

$CO_2$ Temperature Programmed Desorption ($CO_2$-TPD) Tests for the Carbon Dioxide Adsorbent Including the Chabazite Zeolite:

$CO_2$-TPD tests are conducted using the carbon dioxide adsorbent of Preparation Examples 1 and 2 and zeolite Y (not structurally transformed) under the following conditions, and the results are shown in FIG. 4.

Adsorption is carried out using 10% $CO_2$, followed by helium purging (total flow rate: 50 cc/min). Thereafter, under helium purging, the temperature increased at from 40° C. to 800° C. with ramping temperature of 10° C./min.

The normalized adsorption amounts are calculated from the results of FIG. 4, and are compiled in Table 3.

TABLE 3

| Adsorbent | Chemical adsorption amount (as normalized) |
|---|---|
| Preparation Example 1 (K—CHA) | 0.72 |
| Preparation Example 2 (Na—CHA) | 1.00 |
| Zeolite Y | 0.64 |

Referring to FIG. 4 and Table 3, it can be understood that the structurally transformed chabazite zeolite shows a greater adsorption amount in comparison with the zeolite that was not structurally transformed, and the zeolite of Preparation Example 2 (Na-CHA) has newly formed adsorption sites for carbon dioxide.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A carbon dioxide adsorbent comprising:
   a chabazite zeolite containing an alkali metal ion or an alkaline earth metal ion, the chabazite zeolite having a Si/Al mole ratio of about 1 to about 9.9, the chabazite zeolite being a reaction product of a non-chabazite structure zeolite, the chabazite zeolite having a chabazite structure obtained by structural transformation using a strong base, the carbon dioxide adsorbent having a $CO_2$ adsorption capacity of greater than or equal to about 5 wt % at a temperature of 120° C.

2. The carbon dioxide adsorbent of claim 1, wherein the Si/Al mole ratio is about 1 to about 3.

3. The carbon dioxide adsorbent of claim 1, wherein the alkali metal ion or the alkaline earth metal ion includes a lithium ion, a sodium ion, a potassium ion, a magnesium ion, or a calcium ion.

4. The carbon dioxide adsorbent of claim 1, wherein the non-chabazite structure zeolite has a faujasite structure or a mordenite structure.

5. The carbon dioxide adsorbent of claim 1, wherein the chabazite zeolite has a specific surface area of 600 m²/g or less.

6. A process for preparing a carbon dioxide adsorbent, comprising:
   obtaining a zeolite having a non-chabazite structure and a Si/Al mole ratio of about 1 to 9.9;
   adding the zeolite to an aqueous solution of a strong base having an alkali metal ion or an alkaline earth metal ion;
   subjecting the zeolite and the aqueous solution to a hydrothermal treatment to obtain a chabazite zeolite including the alkali metal ion or the alkaline earth metal ion; and
   separating the chabazite zeolite, the Si/Al mole ratio of the chabazite zeolite being about 1 to about 9.9, the chabazite zeolite being a reaction product of the non-chabazite structure zeolite, the chabazite zeolite having a chabazite structure obtained by structural transformation using the strong base, the carbon dioxide adsorbent having a $CO_2$ adsorption capacity of greater than or equal to about 5 wt % at a temperature of 120° C.

7. The process of claim 6, further comprising:
   exchanging the alkali metal ion or the alkaline earth metal ion contained in the chabazite zeolite with another alkali metal ion or another alkaline earth metal ion.

8. The process of claim 6, wherein the subjecting the zeolite and the aqueous solution to a hydrothermal treatment includes the chabazite structure being formed without using a structure directing agent.

9. The process of claim 6, wherein the obtaining a zeolite having a non-chabazite structure includes obtaining faujasite, mordenite, or a combination thereof.

10. The process of claim 6, wherein the obtaining a zeolite having a non-chabazite structure includes the Si/Al mole ratio ranging from about 1 to about 3.

11. The process of claim 6, wherein the adding the zeolite to an aqueous solution includes the strong base including KOH, NaOH, or LiOH.

12. The process of claim 6, wherein the subjecting the zeolite and the aqueous solution to a hydrothermal treatment is conducted at a temperature of higher than or equal to about 80° C. for a period of time of about 40 hours or longer.

13. A method of separating carbon dioxide, comprising:
   contacting a carbon dioxide adsorbent with an input gas stream containing carbon dioxide, the carbon dioxide adsorbent including a chabazite zeolite containing an alkali metal ion or an alkaline earth metal ion, the chabazite zeolite having a Si/Al mole ratio of about 1 to about 9.9, the chabazite zeolite being a reaction product of a non-chabazite structure zeolite, the chabazite zeolite having a chabazite structure obtained by structural transformation using a strong base, the carbon dioxide adsorbent having a $CO_2$ adsorption capacity of greater than or equal to about 5 wt % at a temperature of 120° C.

14. The method of claim 13, wherein the contacting a carbon dioxide adsorbent includes the alkali metal ion or the alkaline earth metal ion including a lithium ion, a sodium ion, a potassium ion, a magnesium ion, or a calcium ion.

15. The method of claim 13, wherein the contacting a carbon dioxide adsorbent includes the Si/Al mole ratio ranging from about 1 to about 3.

16. The method of claim 13, further comprising:
   heat-treating the carbon dioxide adsorbent at a temperature of about 200° C. to about 500° C. to desorb the carbon dioxide.

17. The method of claim 16, wherein the heat-treating is performed under a reduced pressure.

18. The method of claim 13, wherein the contacting a carbon dioxide adsorbent includes the input gas stream further including at least one gas selected from hydrogen, nitrogen, and methane.

19. The method of claim 13, wherein the contacting a carbon dioxide adsorbent includes the input gas stream contacting the carbon dioxide adsorbent at a temperature of about 30° C. to about 500° C.

* * * * *